(12) United States Patent
Dobyns

(10) Patent No.: US 10,617,941 B2
(45) Date of Patent: *Apr. 14, 2020

(54) COMPUTER GAME INTERFACE

(71) Applicant: Douglas Howard Dobyns, Lindon, UT (US)

(72) Inventor: Douglas Howard Dobyns, Lindon, UT (US)

( * ) Notice: Subject to any disclaimer, the term of this patent is extended or adjusted under 35 U.S.C. 154(b) by 51 days.

This patent is subject to a terminal disclaimer.

(21) Appl. No.: 15/615,625

(22) Filed: Jun. 6, 2017

(65) Prior Publication Data

US 2017/0266547 A1  Sep. 21, 2017

Related U.S. Application Data

(63) Continuation of application No. 13/088,278, filed on Apr. 15, 2011, now Pat. No. 9,669,303.

(60) Provisional application No. 61/325,114, filed on Apr. 16, 2010.

(51) Int. Cl.
*A63F 13/23* (2014.01)
*A63F 13/44* (2014.01)
*A63F 13/843* (2014.01)

(52) U.S. Cl.
CPC .............. *A63F 13/23* (2014.09); *A63F 13/44* (2014.09); *A63F 13/843* (2014.09); *A63F 2300/30* (2013.01); *A63F 2300/63* (2013.01); *A63F 2300/8088* (2013.01)

(58) Field of Classification Search
CPC .. G07F 17/3232; A63F 13/12; A63F 13/2145; A63F 2300/20; A63F 2300/204; A63F 13/23; A63F 13/44; A63F 13/843
USPC ........................................ 463/30, 31, 36, 40
See application file for complete search history.

(56) References Cited

U.S. PATENT DOCUMENTS 6,684,062 B1 * 1/2004 Gosior .................... A63F 13/02
375/346

* cited by examiner

*Primary Examiner* — David Duffy
*Assistant Examiner* — Ankit B Doshi
(74) *Attorney, Agent, or Firm* — Thorpe North & Western, LLP.

(57) ABSTRACT

A computer game interface is disclosed, having controller inputs configured to receive an input signal from a user interface controller and to enable the user to control a user controllable element of a game on a computer. The computer game interface also has a controller output that sends an output signal to the computer, the output signal having information to control the user controllable element of the game. Another element of the computer game interface is a switching module in communication with the controller inputs and the controller output. The switching module selects an input signal from the input signals received by the controller inputs and communicates the input signal to the controller output. An additional element of the computer game interface is a timer controlling the switching module to switch the input signal communicated to the controller output based on a time period.

17 Claims, 8 Drawing Sheets

COMPUTER GAME INTERFACE

PRIORITY CLAIM

This application is a continuation of U.S. patent application Ser. No. 13/088,278, filed Apr. 15, 2011, which claims the benefit of U.S. Provisional Patent Application Ser. No. 61/325,114, filed Apr. 16, 2010, both of which are incorporated herein by reference.

BACKGROUND

Often, the number of people that desire to play a video game exceeds the capacity of the video game design. For example, a group of people may wish to play a single player game at the same time. Even where a video game is designed for multiple players, the number of people in the group may exceed the number of players for which the multiplayer game was designed. This disparity may lead to uncomfortable social situations. It can be frustrating for those that wait, which can lead to conflicts over who can play.

SUMMARY

A computer game interface is disclosed, which can be used to enhance a video game experience. The computer game interface can have controller inputs configured to receive an input signal from a user interface controller and to enable the user to control a user controllable element of a game on a computer. The computer game interface also has a controller output that sends an output signal to the computer, the output signal having information to control the user controllable element of the game. Another element of the computer game interface is a switching module in communication with the controller inputs and the controller output. The switching module selects an input signal from the input signals received by the controller inputs and communicates the input signal to the controller output. An additional element of the computer game interface is a timer controlling the switching module to switch the input signal communicated to the controller output based on a time period.

BRIEF DESCRIPTION OF THE DRAWINGS

The present technology will become more fully apparent from the following description and appended claims, taken in conjunction with the accompanying drawings. Understanding that these drawings merely depict examples of the present technology they are, therefore, not to be considered limiting of its scope. It will be readily appreciated that the components of the present technology, as generally described and illustrated in the figures herein, could be arranged and designed in a wide variety of different configurations. Nonetheless, the technology will be described and explained with additional specificity and detail through the use of the accompanying drawings in which:

DETAILED DESCRIPTION

The following detailed description of examples of the technology makes reference to the accompanying drawings, which form a part hereof and in which are shown, by way of illustration, examples in which the technology may be practiced. While these examples are described in sufficient detail to enable those skilled in the art to practice the technology, it should be understood that other examples may be realized and that various changes to the technology may be made without departing from the spirit and scope of the present technology. Thus, the following more detailed description of the examples of the present technology is not intended to limit the scope of the technology, as claimed, but is presented for purposes of illustration only to describe the features and characteristics of the present technology, and to sufficiently enable one skilled in the art to practice the technology. Accordingly, the scope of the present technology is to be defined solely by the appended claims.

Figure 1:
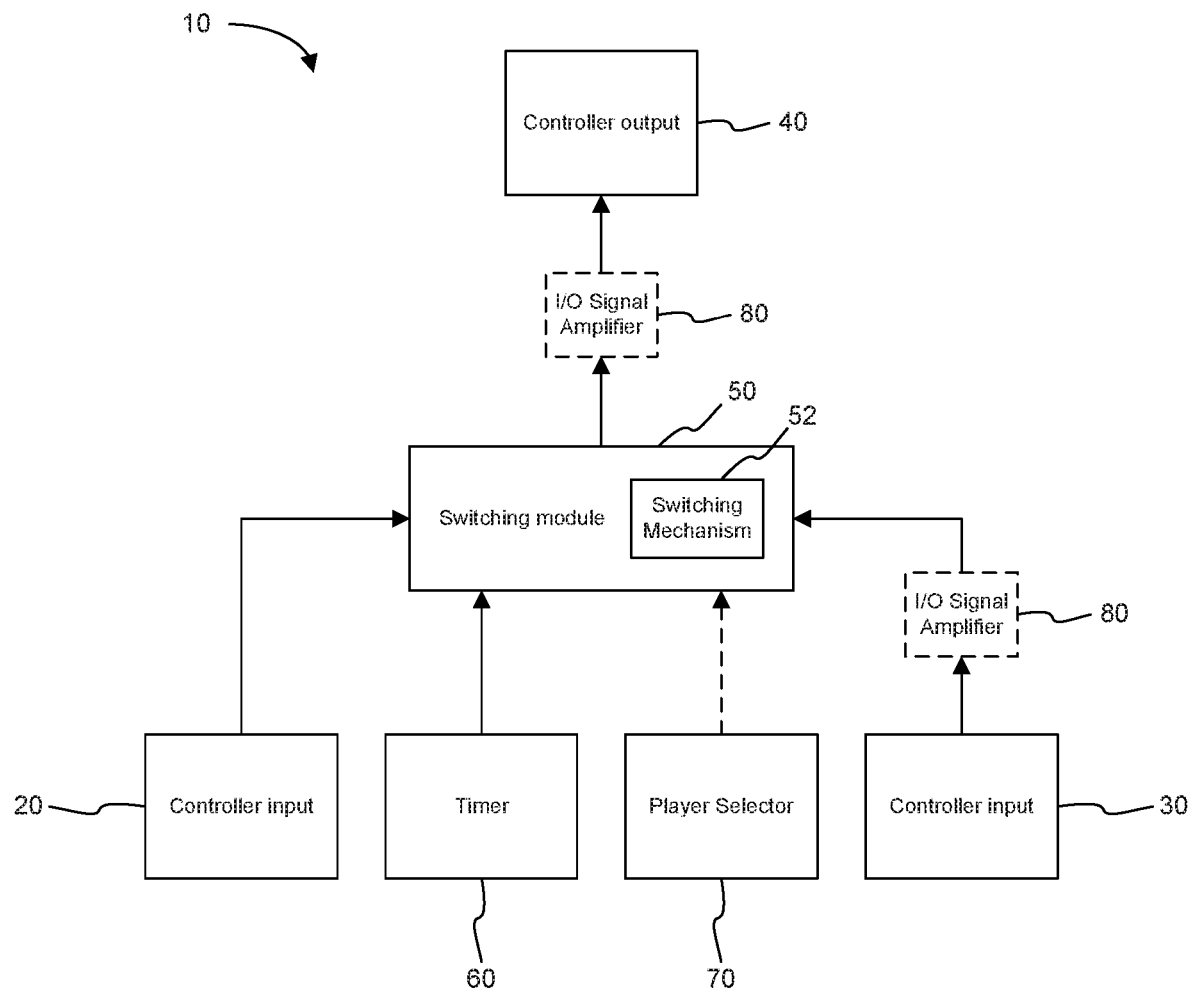
FIG. 1 illustrates a block diagram of a computer game interface in accordance with an example of the present technology.

With reference to FIG. 1, a block diagram of a computer game interface 10 is provided. Illustrated at blocks 20 and 30 are controller inputs. Each controller input may be configured to receive an input signal from a different user interface controller and to enable the user to control a user controllable element of a game on a computer. For example, characters or objects in a game may be shown on a display such as a TV, projector or monitor. The user may utilize a user interface controller to control playable characters or objects in the game that are displayed on the TV or monitor.

The user may use the computer game interface to achieve a variation on standard game play. For example, the user may connect the computer game interface to a computer or game console and connect the user interface controllers to the computer game interface. The computer game interface may be used to select which user interface controller is active at a given time. Switching between user interface controllers may be governed by a timer or switching may be manually controlled by a user. Thus, the computer game interface device may expand the number of participants in a video game beyond the number for which the game was designed. For example, the computer game interface may enable multiple players to participate in a single player game. In this example, one user may begin playing the game and, at the expiration of a time period, the computer game interface may switch active controllers such that a second user may play the game using a different controller. Switching may occur quickly or randomly so that the players may be motivated to pay close attention to the game or be caught off guard, which may contribute to the enjoyment of the game. Similarly, the computer game interface device may enable a multiplayer game to accommodate even more players and create a new gaming experience by giving each player control over the game for a time interval.

A user interface controller may be a device that interacts directly with humans. In certain examples, a user interface controller may receive input from a human. In certain other examples, a user interface controller may deliver output to humans. In still other examples, a user interface controller may receive input from humans and deliver output to humans. In some examples, a user interface controller may be a human interface device (HID).

In certain examples, a user interface controller may be used to enable a human to interact with a computer game. In a gaming context, the user interface controllers may be used to govern the movement and actions of a playable body or object in a video or computer game. Examples of such user interface controllers are game pads, joysticks, paddles, keyboards, mice, trackballs, throttle quadrants, steering wheels, yokes, pedals, touch screens, motion sensors, light guns, dance pads, balance boards, microphones, camera, wireless sensor, controllers resembling musical instruments, or any other device designed for gaming that can receive input from a human. In certain aspects, human input may be received by a device such as a camera or sensor that detects body position. In some examples, input techniques may include voice, gestures, or writing using a pen or stylus. The type of user interface controller may depend on the type of game to be played.

User interface controllers may be configured to be connected to a game console or computer by wired or wireless connections. An example of a wireless connection is Bluetooth®. Wireless connections may be accomplished by synching the wireless user interface controllers with the computer game interface and synching the computer game interface with the computer or game console. In general, connections between components of the present disclosure may include wired and/or wireless connections. Illustrative examples of connections in the figures and specification are not to be limited to wired or wireless connections.

In one example, both the wireless user interface controllers and the computer game interface may be wirelessly synchronized with the computer or game console, where the computer game interface sends information to the computer or game console to arbitrate which user interface controller will be active. In another example, the wireless user interface controllers may be synchronized to the computer game interface, which may be wired to the computer or game console. The wireless user interface controllers may be standard off-the-shelf devices or proprietary devices designed specifically to work with the computer game interface. In yet another example, the user interface controllers may be connected to the computer game interface by a wire and the computer game interface may be wirelessly synchronized to the computer or game console. Alternatively, the computer game interface may be wirelessly synchronized to a dongle or adapter which directly connects to the computer or game console through the standard wired user interface controller port(s) or auxiliary interface port(s). The wired user interface controllers may be standard off-the-shelf devices or proprietary devices designed specifically to work with the computer game interface.

In general, a computer game interface 10 may have a plurality of controller inputs. In one example, as shown in the figure, a computer game interface 10 may have two controller inputs 20 and 30. The number of controller inputs in a computer game interface may be chosen to enable a given number of users to participate in a computer game via the computer game interface. There may be no limit to the number of controller inputs in a computer game interface, however, practical considerations such as space constraints and the number of potential users who may participate in a game may factor into the design configuration.

Controller inputs may be configured to connect with a line or signal feed from a user interface controller. Examples of such connections are ports for USB, PS/2, pin connections, slot connections, or any other form of connector for a computer or game console input. In certain examples, controller inputs may enable a wireless connection with a user interface controller by providing a connection with a wireless receiver or antenna.

With further reference to FIG. 1, illustrated at block 40 is a controller output of the computer game interface 10. The controller output may send an output signal to a computing device or game console. An output signal may include information to control a user controllable element of a computer game. In certain examples, a controller output 40 may include a connection such as a port for USB, PS/2, pin connections, slot connections, or any other form of connector for a computer or game console. In examples utilizing a wired connection to a computer or game console, the end of the wire to be connected to the computer or game console may include a connector suitable to deliver a signal from a user interface controller to the computer or game console. Such connections were discussed above and may include ports for USB, PS/2, pin and slot connections, or any other form of connector for a computer or game console input. In certain other examples, a controller output may be hardwired to connect the computer game interface with a computer or game console.

The computer game interface may contain an input/output (I/O) signal amplifier 80 for wired connections. This would allow the wired cable length to be increased without signal loss between each component of the system (i.e. computer or game console, computer game interface, controller inputs, etc.). In many applications the wired controller inputs may be the maximum length allowed given the communication protocol used. For example, the USB 1.1 Low Speed Device specification allows for a maximum cable length of 3 meters. Cables longer than 3 meters may experience signal degradation due to loss in the cable. It is common for many wired controller inputs to be supplied with the maximum cable length of 3 meters. Thus, if such a controller were connected to the computer game interface, and the computer game interface were connected to the computer or game console with an additional 2 meter cable, the maximum cable length of 3 meters would be exceeded (3 meters+2 meters=5 meters). By providing an I/O signal amplifier at the computer game interface, the I/O signals can be amplified and the integrity of the signal maintained over the additional cable length.

Illustrated at block 50 is a switching module. A switching module 50 may be in communication with the controller inputs 20 and 30 and the controller output 40. The switching module may select an input signal from the input signals received by the controller inputs and communicate the input signal to the controller output.

A switching module 50 may comprise mechanical, electromechanical, and/or electronic components or elements. In certain examples, a switching module may select an input signal using software. In certain other examples, a switching module may select an input signal using hardware. A switching module may be configured to select analog and/or digital input signals and communicate analog and/or digital signals to the controller output.

A switching module 50 may comprise an application-specific integrated circuit (ASIC). In certain other examples, a switching module may comprise a field-programmable gate array (FPGA). In still other examples, a switching module may comprise a microcontroller or other programmable device.

A switching module may operate automatically to control the input signals communicated to the controller output 40. Automatic operation of the switching module 50 may be governed by a timer 60, discussed in more detail below. In some examples, the timer may be incorporated with the switching module. For example, a timer and switching module may both be part of an integrated circuit. In certain examples, a switching module may be manipulated by a human (such as by a button) to select a different input signal to be communicated to the controller output. In one aspect of this example, the switching module and/or the timer may have a manual control located remotely from the switching module and/or the timer. For example, the switching module and the timer may be part of an integrated circuit located in an interior region of a computer game interface. In this example, the switching module and the timer may have manual controls, such as a buttons, located on an exterior region of the computer game interface to provide for ready access to the controls by the user.

In some examples, a switching module 50 may comprise logic gates to select an input signal to be communicated to the controller output 40. Examples of switches that may be used include solid state switches, such as a directional or bidirectional analog, or directional or bidirectional digital switches such as a 74HC4066, AD7512, or ADG 772, mechanical switches such as a relay, or coupled devices such as opto-couplers or magnetically coupled isolators, or any other type of switch that may allow a switching module to select an input signal and communicate the input signal to the controller output.

In certain examples, the signals may be reproduced, or passed through, from an input port of a microcontroller or similar programmable device to the output port of the same device. The use of a programmable device may allow the computer game interface to monitor activity and/or information sent between the user interface controller and the computer or game console to determine certain information. For example, the computer game interface may identify if a unique identification or address is assigned to the user interface controllers, and the computer game interface may retransmit this identification information to the user interface controller at certain times to communicate directly with the device to either control the user interface controller directly or to emulate a desired behavior of the computer or game console. Alternatively, the computer game interface may use this information to communicate back to the computer or game console in a similar manner.

A computer game interface 10 may comprise a switching module 50 having a manually operated switching mechanism 52 that may cause the switching module 50 to select an input signal from one interface controller as the input signal communicated to the controller output 40. For example, a computer game interface may include buttons, a touch screen, dials, levers, toggles, etc. that may be used to manually operate the switching mechanism of the switching module. In one aspect, the manually operated switching mechanism comprises a plurality of switching mechanisms, where each of the switching mechanisms is configured to correspond to one of the user interface controllers. Thus, each user interface controller with a corresponding switching mechanism can be manually selected by a user.

In one aspect, manually controlling the switching module 50 may override the timer 60 and cancel the timing function of the timer 60. In another aspect, manually controlling the switching module may override the timing function but, instead of cancelling the timing function, the timer may be reset and begin timing for a new time period. The timer and timer functions are discussed further below.

In some examples, a computer game interface 10 may comprise a switching module 50 having a display that shows which controller is active, i.e., showing which controller's input signal is being communicated to the controller output 40 and is, thus, controlling the game. In certain examples, a light such as an LED may be associated with each controller input. In a specific aspect of this example, lights may be color coded to indicate when a particular controller input is active. For example, red may indicate that the controller input is presently inactive and green may indicate that the controller input is presently active.

In one aspect, an alert can be configured to identify when the switching module switches the input signal communicated to the controller output. In a particular aspect, the alert can be associated with the timer and includes a warning alert prior to when the time period will elapse, such as five seconds prior to the end of the time period. This can give the users a warning that the time period is about to end and that a different controller input will be active. In another particular aspect, the alert can be visual, audible, tactile, or combinations thereof.

For example, an audible tone may be used to identify that a change in control is occurring or about to occur. In certain examples, the tone may be unique for each user interface controller to help the user identify which user interface controller is being set active. The audible tone may also be a voice command from the user that may be used to control the switching between two players. Alternatively, the computer game interface may cause the user interface controller to vibrate or rumble to indicate a change in control.

In one aspect, the computer game interface can include a player selector 70. The player selector can cause the switching module 50 to select an input signal from a selected interface controller as the input signal communicated to the controller output. In a particular aspect, the player selector can cause the switching module to select the input signal based on a time period, such as when the time period has elapsed. In another aspect, the player selector can cause the switching module to select the input signal from a randomly selected interface controller as the input signal communicated to the controller output. The player selector can be manually actuated by a user or triggered by the timer. In either case, the player selector can select a user determined player or a randomly selected player.

In one example, a button on the computer game interface may activate a manual override to change or extend control. If this button is held down for an extended period of time (3 to 5 seconds) it may activate a randomizer mode where the computer game interface or display rapidly flashes lights, vibrates, and/or makes audible tones to reflect the action of shaking and rolling dice. When the user releases the button, game control is randomly selected. This may provide a method of beginning game play at the start of a game to allow the first player to be selected randomly.

In another example, the computer game interface may return Player 1 control to Player 1 (when control otherwise would have been with another player or transferred away) by pressing a predetermined switch or user interface protocol. This allows control to return to Player 1 to be able to make game setting changes or interact with the game system without the interruption of changing control between multiple users. This may be useful if, at the end of a game, the user is required to make certain selections before the next game can begin. This mode of operation can apply to any player for which the computer game interface is designed to support. For example Player 2 control can also return to Player 2. Once changes are made, the user may then press a predetermined button or user interface method to begin the desired game interface behavior. This functionality may also apply for multiplayer games with multiple user interface controllers connected to the computer game interface. When the game sharing behavior is disabled, each player has control over the appropriate on-screen components. One benefit is that during the disabled mode, the computer game interface may act as an extension for wired user interface controllers. This may enable users to sit or play at a distance greater than the original wired user interface controller allows. Thus, the computer game interface may allow the user to have both a game sharing system and an extension cord—which has a cost saving benefit.

The computer game interface can also include an I/O signal monitor 90. The I/O signal monitor can monitor input and output signals for signal activity. Based on the signal activity, the I/O signal monitor can control the switching module to select a different input signal as the input signal communicated to the controller output. For example, the computer game interface may change players when a player's turn ends in the game by detecting a control signal from the console, game, or software, or by monitoring the control lines between the console and the controller. The frequency of active signals may indicate that the player is still playing. This action may pause when game play is momentarily suspended due to the end of a user's turn. There may also be an indication of the end of a user's turn from a change in signal commands from the host, console, or computer. For example, the end of a player's turn may be signaled by a rumble which can be detected via monitoring the signal lines between the console and the controller. Thus, the I/O signal monitor can detect such signal activity and direct the switching module to switch player control based on the signal activity. In one aspect, the I/O signal monitor can override the timer to control the switching module. In another aspect, the I/O signal monitor is programmable, such that criteria for switching player control may be set or altered by a user.

With continued reference to FIG. 1, illustrated at block 60 is a timer. The timer 60 may control the switching module 50 to switch the input signal communicated to the controller output 40 based on a time period, such as when the time period has elapsed. In one aspect, the timer can comprise a single timer. In another aspect, the timer can include a separate timer for each user interface controller.

The timer may include mechanical, electromechanical, and/or electronic components or elements. In examples utilizing electronic components, timing may be implemented by software or hardware. In certain examples, a timer may utilize a programmable logic controller. In this example, logic may be designed to simulate relays using ladder logic.

In certain examples, a timer 60 may be digital. In certain other examples, a timer may be analog. In particular examples, an electronic timer may be analog (i.e., resembling a mechanical timer) or digital (i.e., using a display similar to a digital clock). In certain examples, a timer may include an integrated circuit. For example, a timer may be implemented as a simple single-chip computer system, similar to a digital watch. In other examples a timer may be mechanical or electromechanical.

The computer game interface 10 may include manual controls for the timer 60. For example, the timer may include functions to set a time period, cancel, reset, clear, start/stop, or any other type of function that may be provided for the timer. Manual timer controls for various timer functions may include a button, touch screen, dial, lever, toggle, or any other manual control for a timer.

In certain examples, a time period may be predetermined by a user. In certain other examples, a time period may be randomly varied from period to period. In some examples, variability may be introduced by a user manually selecting a different time period length for each period. In other examples, variability may be introduced by a random number generator that randomly selects a different time period length for each period. In an aspect of this example, the random number generator of the timer may select a random number when prompted by a user, such as by a manual control as discussed above. Alternatively, the random number generator of the timer may select a random number automatically at the expiration of a previous time period. In addition, the user may select among operating modes whether a random number is generated when prompted by the user or whether the random number is generated automatically.

In one example the timer may be set to allow for unequal time divisions, for example, where one player may be allowed control for 70% of the time while another player has control for 30% of the time. This allows one player to have more game time proportionately to the other player. This feature may be in addition to a main timer, which may allow the switching time to be set at short or long intervals.

In some examples, a timer 60 may include an alert. In certain examples, an alert may notify the game players that a time period has just begun or ended. In certain other examples, an alert may notify the game players that a time period is about to begin or end. This may provide a warning to prepare the players for game play. An alert for a timer may be audible, visual, tactile, or any combination thereof. In certain examples, an audible alert may include a buzzer, beeper, musical tone, recorded human voice, sound file, etc. In an aspect of this example, an audible alert may be produced by a speaker in the computer game interface. In another aspect of this example, an audible alert may be produced by sending a signal to a TV or other sound producing device external to the computer game interface. The audible alert signal may be sent through the controller output or through an audio line out port on the computer game interface. In certain other examples, a visual alert may be a flashing light or a changing light color. In one aspect of this example, the light may be located on the computer game interface. In another aspect of this example, a visible alert may be produced by sending a signal to the TV or monitor to show an alert display indicating that a time period has expired. The visible alert signal may be sent through the controller output or through a line out port on the computer game interface. In certain examples, a tactile alert may include a signal sent to a user interface controller, such as through the controller input connection. In one aspect of this example, the user interface controller may be configured to rumble or shake to indicate that a time period has begun or ended. In another aspect of this example, the user interface controller may be configured to send a mild electrical shock to the user to indicate that a time period has begun or ended. The signal may be sent through a line out port from the computer game interface.

In certain examples, computer game interface information is displayable in a format visible to the user. For example, the computer game interface information can be a timer display, an alert, an alarm, a game mode, a player selection, or combinations thereof. In one aspect, the format visible to the user can be a monitor, a television, a liquid crystal display, a plasma display, a light emitting diode display, or combinations thereof. In certain examples, the computer game interface information may be visible on the computer game interface 10. In a particular example, a display on a computer game interface may be an LCD.

A timer display, for example, may indicate any useful information related to the timer, such as whether the timer is active, the time remaining in the time period, whether the timer is set to repeat the current time period length or to automatically select a random period length, or any other useful information pertaining to the timer. A timer display may be presented as a digital or analog representation.

A user interface controller may include additional interface ports (not shown) such as for memory cards to save or copy game data (in any available memory card format i.e., a game console specific format, USB, Memory Stick™, microSD™ CompactFlash®, etc.), an audio line in (i.e., for digital music players, microphones, etc.), an audio line out (i.e., for headphones, etc.), or any other input/output port that may be associated with computers or game consoles.

A computer game interface 10 may be powered by battery, receive power from a computer or game system (i.e. through the output line), or receive power from a power outlet via a power cord. In certain examples, a rechargeable battery or capacitive storage device may be used.

Figure 2:
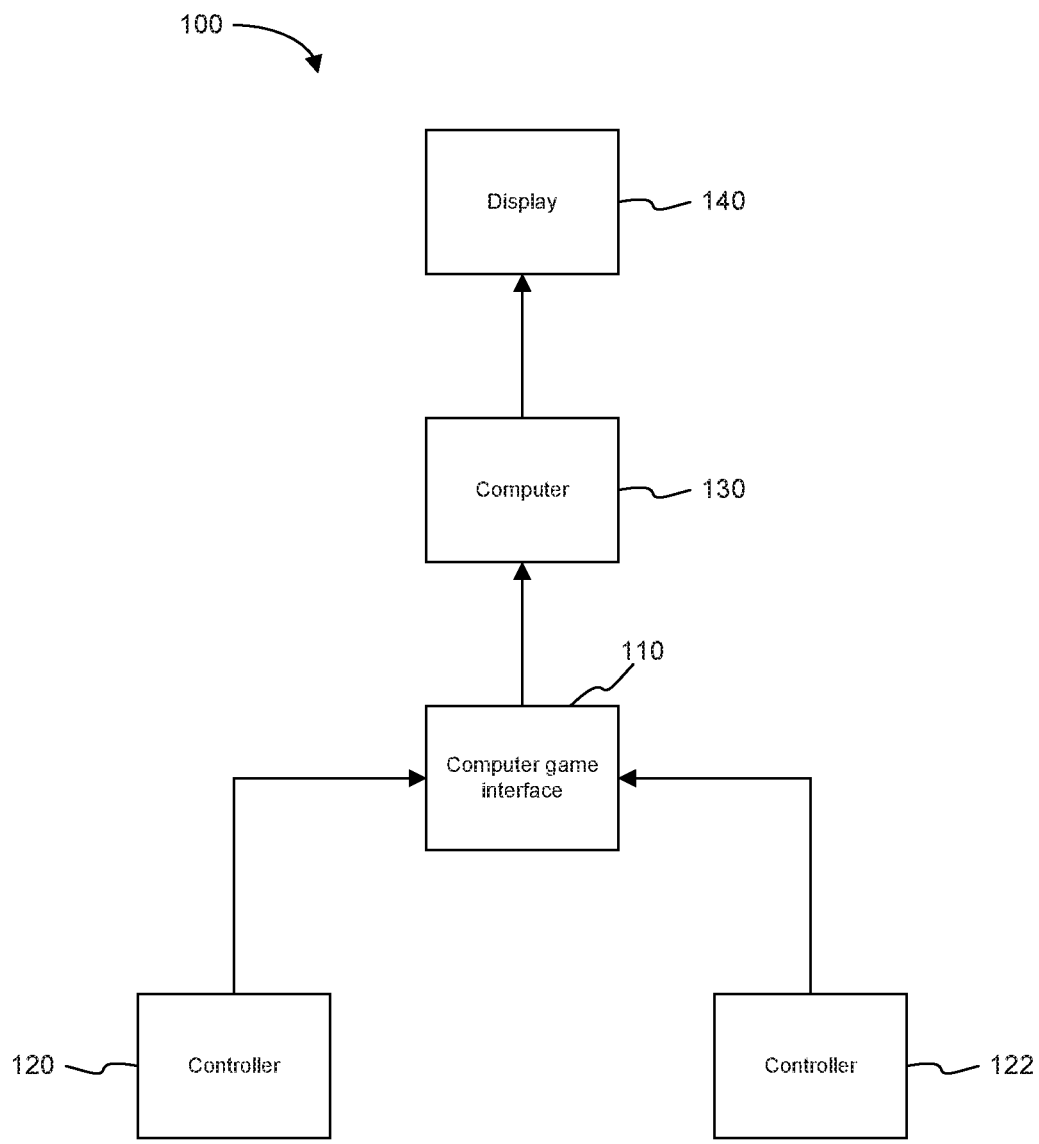
FIG. 2 illustrates a block diagram of a computer game system in accordance with an example of the present technology.

With reference to FIG. 2, illustrated is a block diagram of a computer game system 100. Illustrated at block 130 is a computer. A computer 130 may be any computing device capable of running game software or hardware. In certain examples, a computer may be a personal computer such as a desktop PC or a laptop. In certain other examples, a computer may be a game console such as an Xbox®, Playstation®, Wii®, etc. In still other examples, a computer may be a mobile device, cell phone, calculator, digital music player, wristwatch, or any other device capable of executing a computer game. A computer may be local to the user or users or the computer may be at a remote location and connected by a network such as the internet. A remote device may be a wireless device or it may be a device with a wired connection.

A computer may include a game. In some examples, a game may be encoded in a machine readable storage medium such as on an optical memory, magnetic memory, flash memory, firmware, etc. In certain examples, a game may comprise software. In some examples, a game may be designed as a single player game or a multiplayer game. In certain examples, a game may be running on a local computer or a remote computer, such as a computer connected through a network such as the internet.

Illustrated at blocks 120 and 122 are user interface controllers, as discussed above. As illustrated in the figure, a computer game system 100 may include a plurality of user interface controllers 120 and 122. In certain examples a user interface controller may enable a user to control a user controllable element of a computer game. In certain other examples, a user interface controller may be used to control anything on a computer. For example, a user interface controller may be used to enter text, start programs, navigate the World Wide Web, or give the user control to perform any task that may be accomplished on a computer using peripheral hardware.

Illustrated at block 110 is a computer game interface. A computer game interface 110 may be operably connected to the computer 130 and the plurality of user interface controllers 120 and 122. As discussed above, the computer game interface may have a plurality of controller inputs configured to receive input signals from the plurality of user interface controllers. A computer game interface may also include a controller output that sends an output signal to the computer. The output signal may have information to control the user controllable elements of the game. A computer game interface may further include a switching module in communication with the plurality of controller inputs and the controller output. The switching module may select at least one input signal from the input signals received by the plurality of controller inputs and communicate the input signal to the controller output. Additionally, a computer game interface may include a timer controlling the switching module to select at least one input signal communicated to the controller output based on a time period, such as when the time period has elapsed.

In some examples, a computer game interface 110 may be a separate component from a computer 130. In other examples, a computer game interface may be internal to a computer. In an aspect of this example, a computer game interface may be integrated with a computer.

Illustrated at block 140 is a display. A display 140 may be connected to the computer 130 to display the computer game. Any display, such as a TV, projector, or computer monitor, may be used for such a display; however, newer games on newer computers may be better displayed on high definition TVs or monitors.

Figure 3:
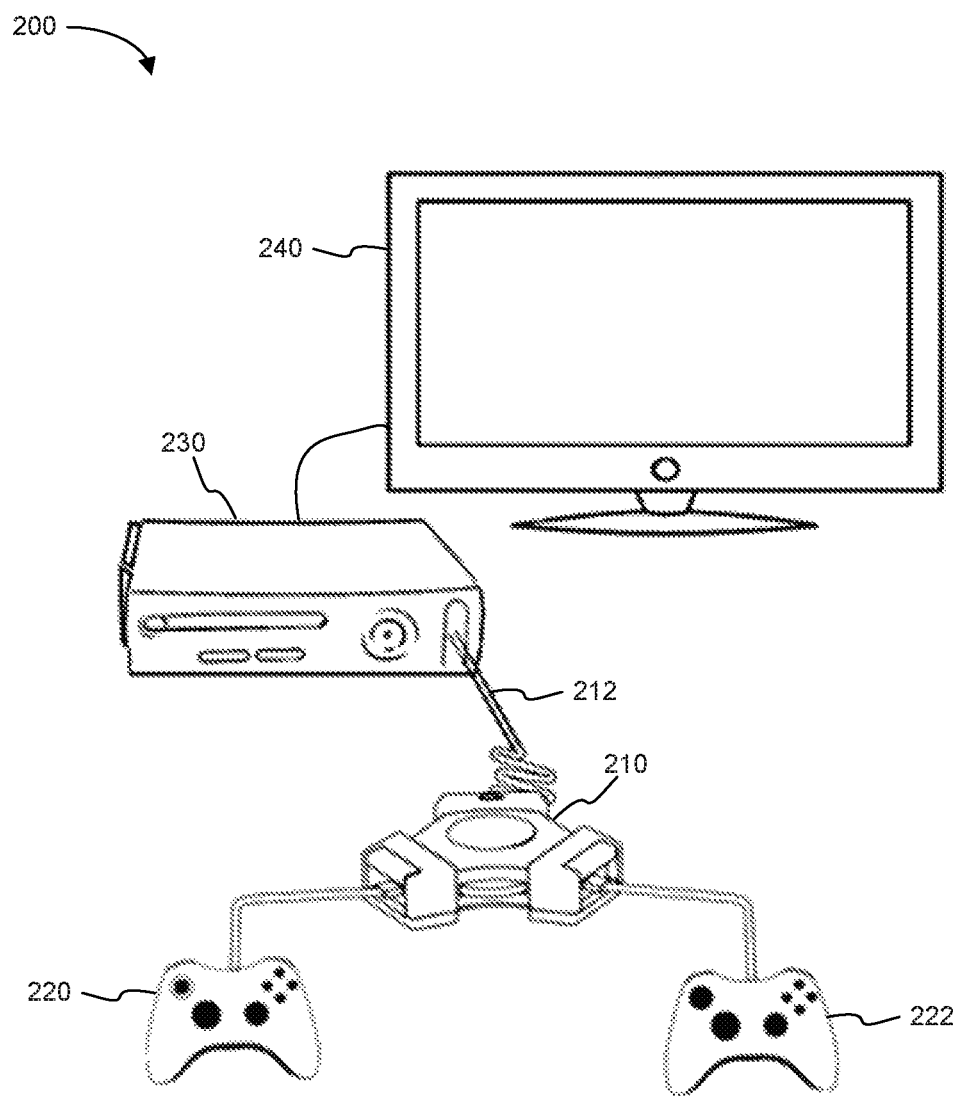
FIG. 3 illustrates one example of the computer game system in FIG. 2.

With reference to FIGS. 3-6, illustrated are example examples of computer game systems, as discussed above. FIG. 3 illustrates computer game system 200. As shown, user interface controllers 220 and 222 may be connected to a computer game interface 210. The computer 230 may be connected to a display 240 in order to display the computer game to the users. In this example, the computer game interface output may have a wired connection 212 that may connect to the computer 230. Thus, this example illustrates that a computer game interface controller output may substitute for a single user interface controller. Because of the single connection between the computer game interface and the computer game system, this arrangement can be used for single player games.

In one aspect, a single connection between a computer game interface can be used in multiplayer games. For example, two computer game interface units can be connected to a computer game system, each one with a single connection to the computer game system corresponding to the connections for a two player game. Thus, each computer game interface unit can enable multiple users to take part in controlling one of the players in the two player game.

Figure 4:
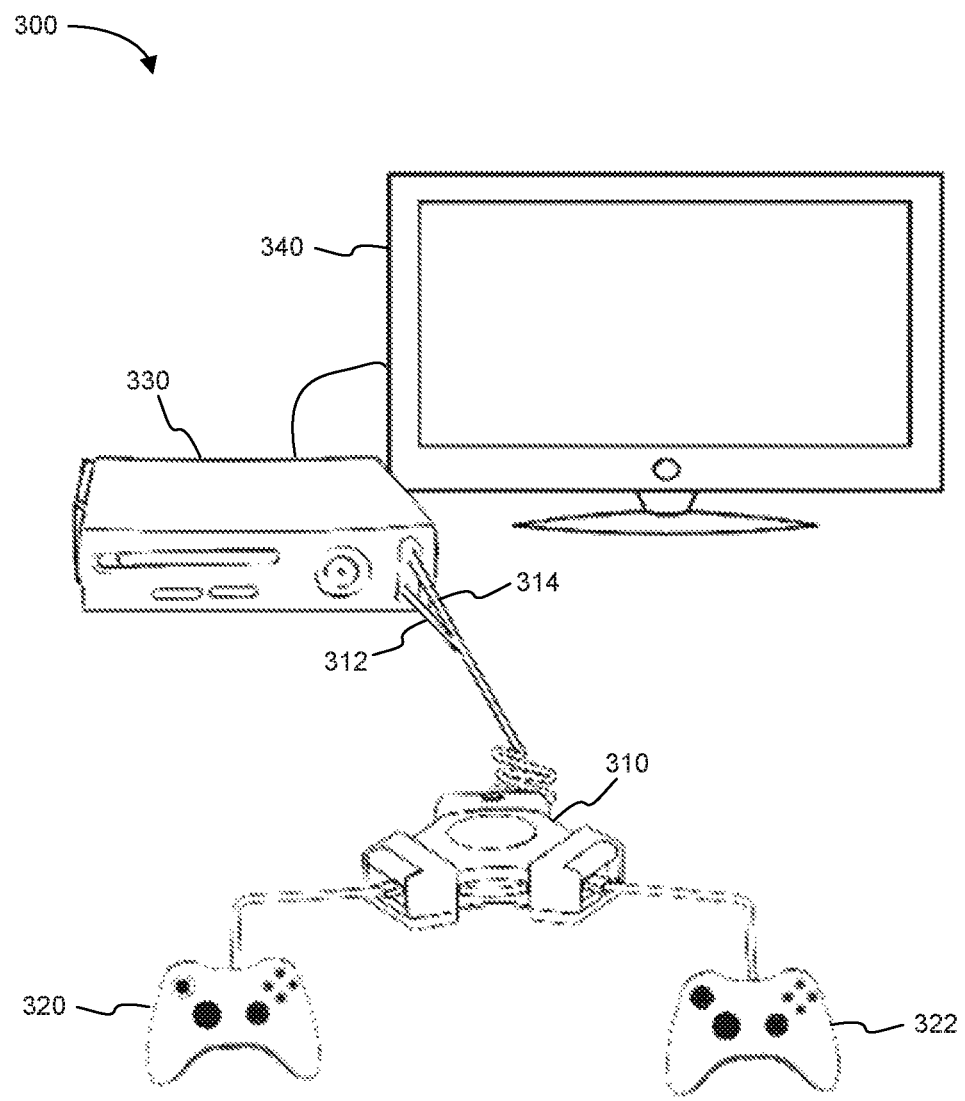
FIG. 4 illustrates a second example of the computer game system in FIG. 2.

In another example, FIG. 4 illustrates a computer game system 300. As shown, user interface controllers 320 and 322 may be connected to a computer game interface 310. The computer 330 may be connected to a display 340 to provide a display for the game. In this example, however, the computer game interface output may have a wired connection having a plurality of leads 312 and 314 that may connect to the computer. Thus, this example illustrates that a computer game interface controller output may substitute for a plurality of user interface controllers. Because of the plurality of connections between the computer game interface and the computer game system, this arrangement can be used for multiplayer games.

Accordingly, an example of this example may include multiple players and a multiple player game. In this example, the software or program may be designed to have two players and two user interface controllers. The computer game interface may allow for Player 1 to be connected to Port 1 of the computer or game console and Player 2 to be connected to Port 2 of the computer or game console. In this configuration, game play may function as intended without the computer game interface. However, after a trigger event occurs (via a timer as previously discussed or via a manual interface control on the computer game interface, for example) the Player 1 connection may be changed from Port 1 to Port 2 of the computer or game console, and the Player 2 connection may be changed from Port 2 to Port 1. This causes each player to change places, roles, control. This example may add to the original intent of the software program and may make a game or program appear new or entertaining in a different way.

Figure 5:
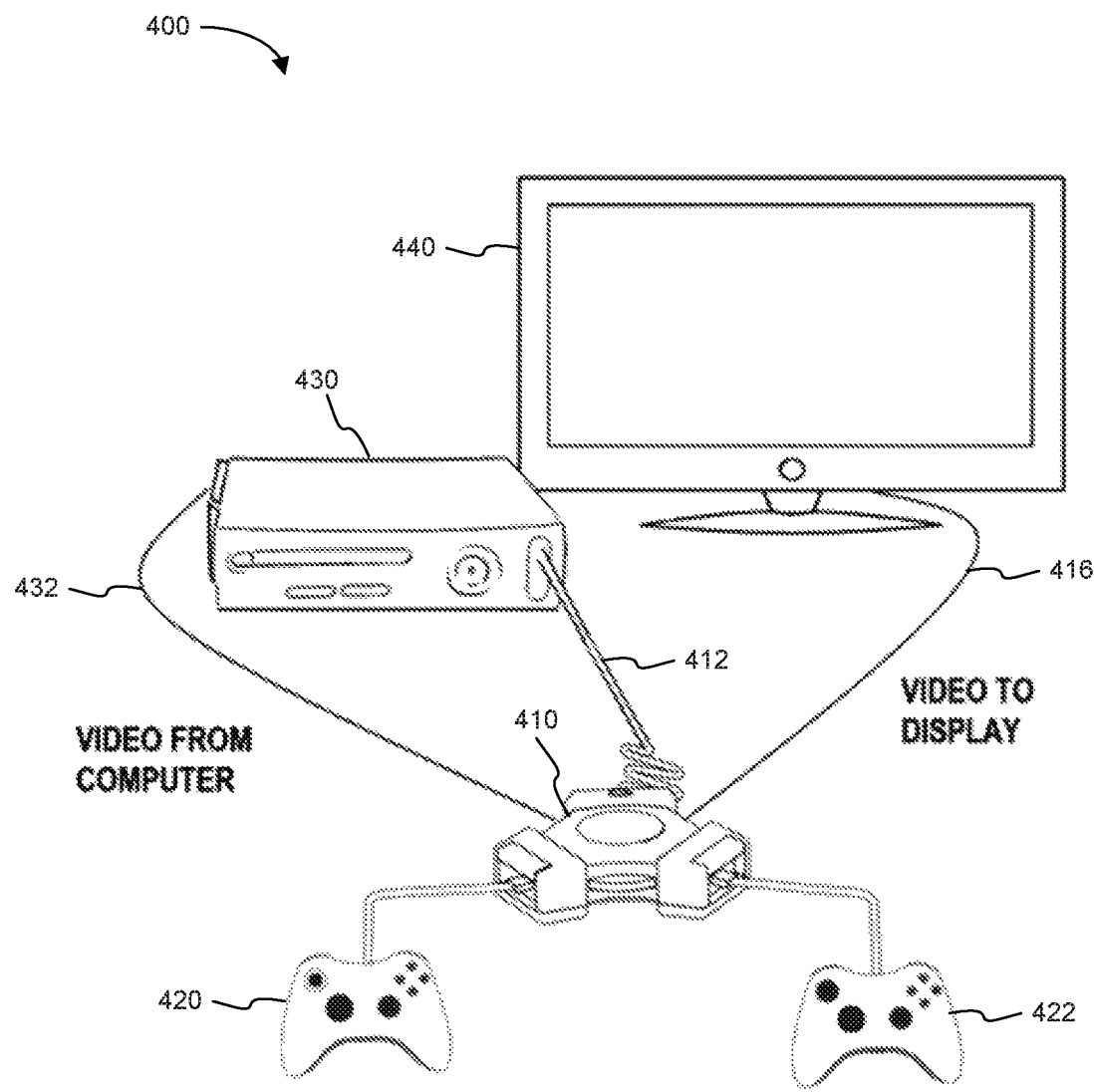
FIG. 5 illustrates a third example of the computer game system in FIG. 2.

In yet another example, FIG. 5 illustrates a computer game system 400. As shown, user interface controllers 420 and 422 may be connected to a computer game interface 410. In this example, the computer game interface output may have a wired connection 412 that may connect to the computer 430. The computer 430 may be connected to the computer game interface 410 by connection 432, which is connected to display 440 by connection 416 in order to display the computer game to the users. Thus, this example illustrates that the video or display output signal from the computer or game console may be connected through the computer game interface to the TV, monitor, or display to allow the computer game interface to provide the desired video signal to the TV, monitor, or display.

Figure 6:
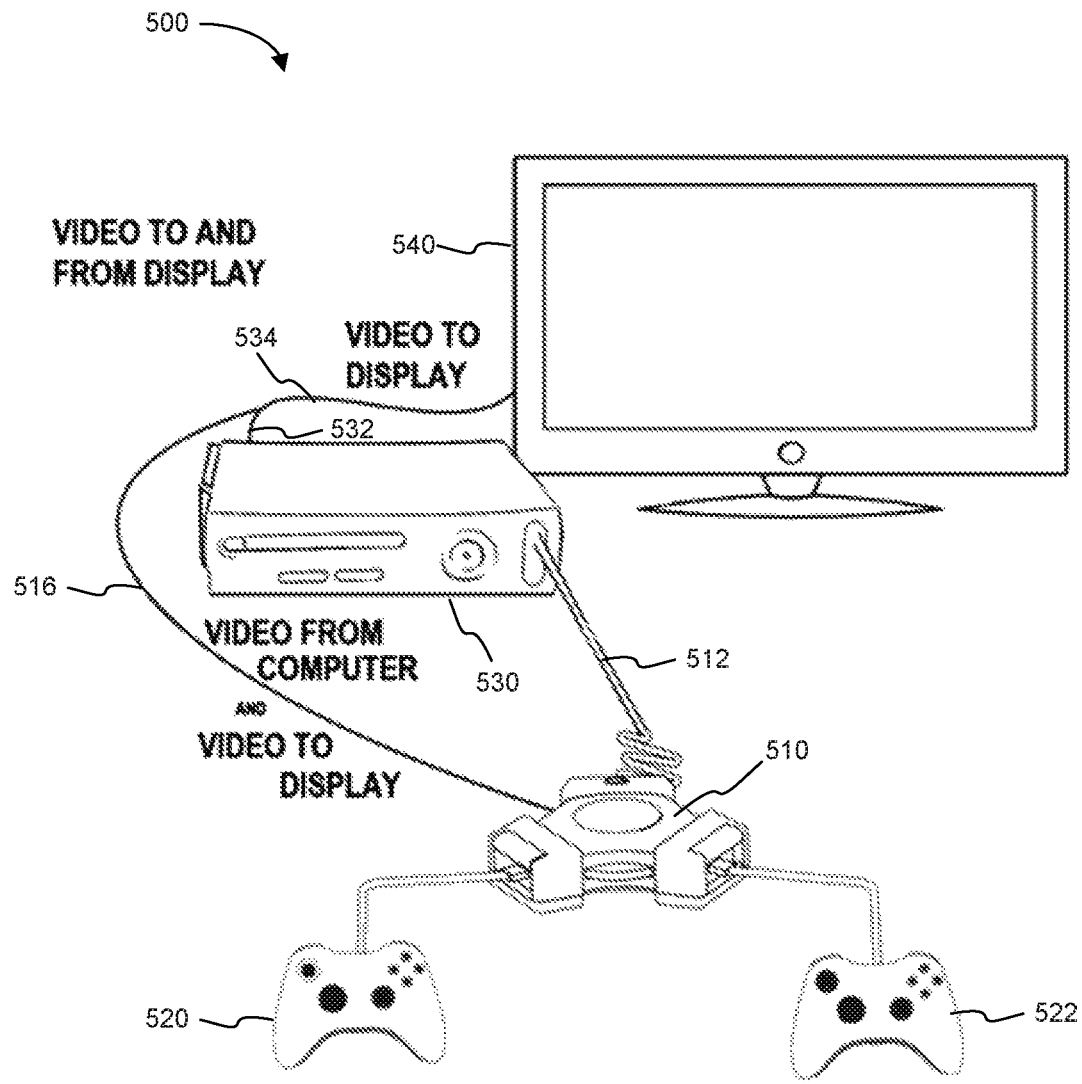
FIG. 6 illustrates a fourth example of the computer game system in FIG. 2.

In still another example, FIG. 6 illustrates a computer game system 500. As shown, user interface controllers 520 and 522 may be connected to a computer game interface 510. In this example, the computer game interface output may have a wired connection 512 that may connect to the computer 530. The computer 530 may be connected to a display 540 by connections 532 and 534. The computer 530 may also be connected to the computer game interface by connections 532 and 516. The computer game interface may be connected to the display by connections 516 and 534. Thus, this example illustrates various connections that may be used to display the computer game to the users.

Figure 7:
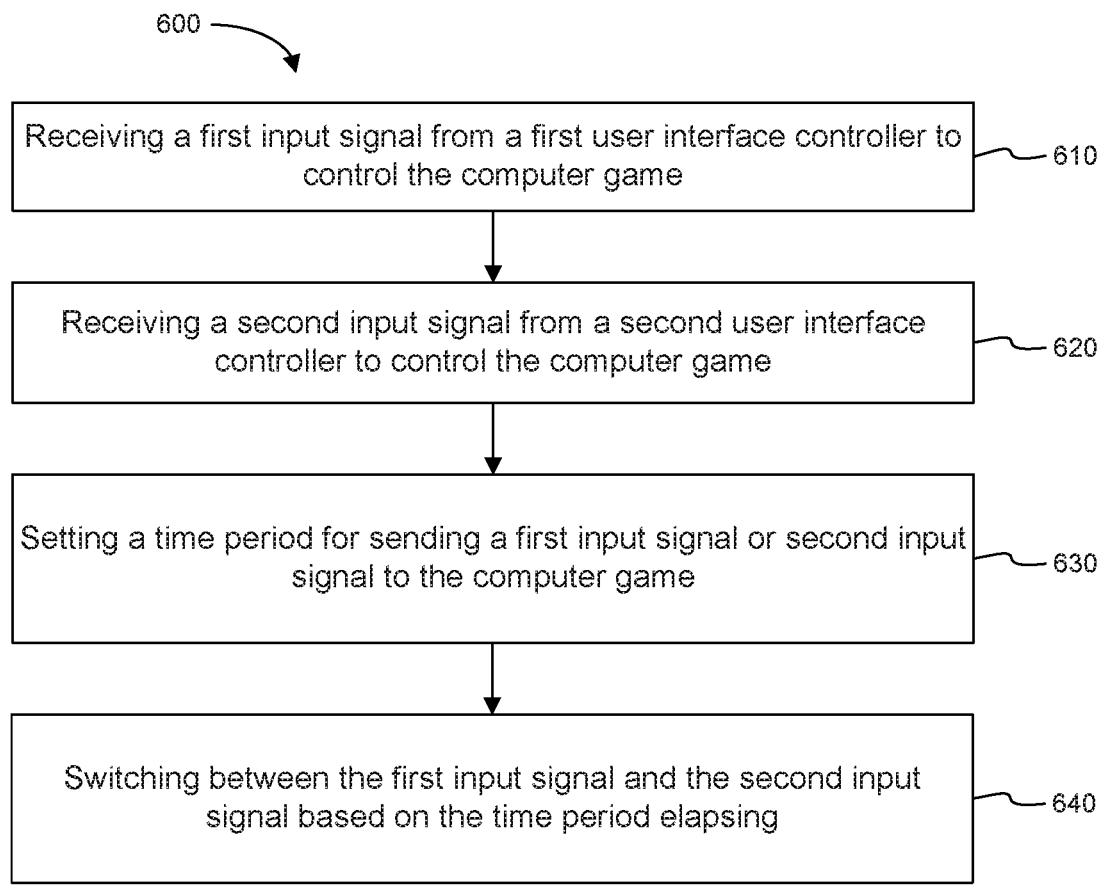
FIG. 7 illustrates a block diagram of a method of playing a computer game on a computer using a computer game interface in accordance with an example of the present technology.

With reference to FIG. 7, illustrated is a block diagram of a method 600 of playing a computer game on a computer using a computer game interface. One method step, illustrated at block 610, may be receiving a first input signal from a first user interface controller to control the computer game. Another method step, illustrated at block 620, may be receiving a second input signal from a second user interface controller to control the computer game. A further method step, illustrated at block 630, may be setting a time period for sending a first input signal or second input signal to the computer game. An additional method step, illustrated at block 640, may be switching between the first input signal and the second input signal based on the time period elapsing.

Figure 8:
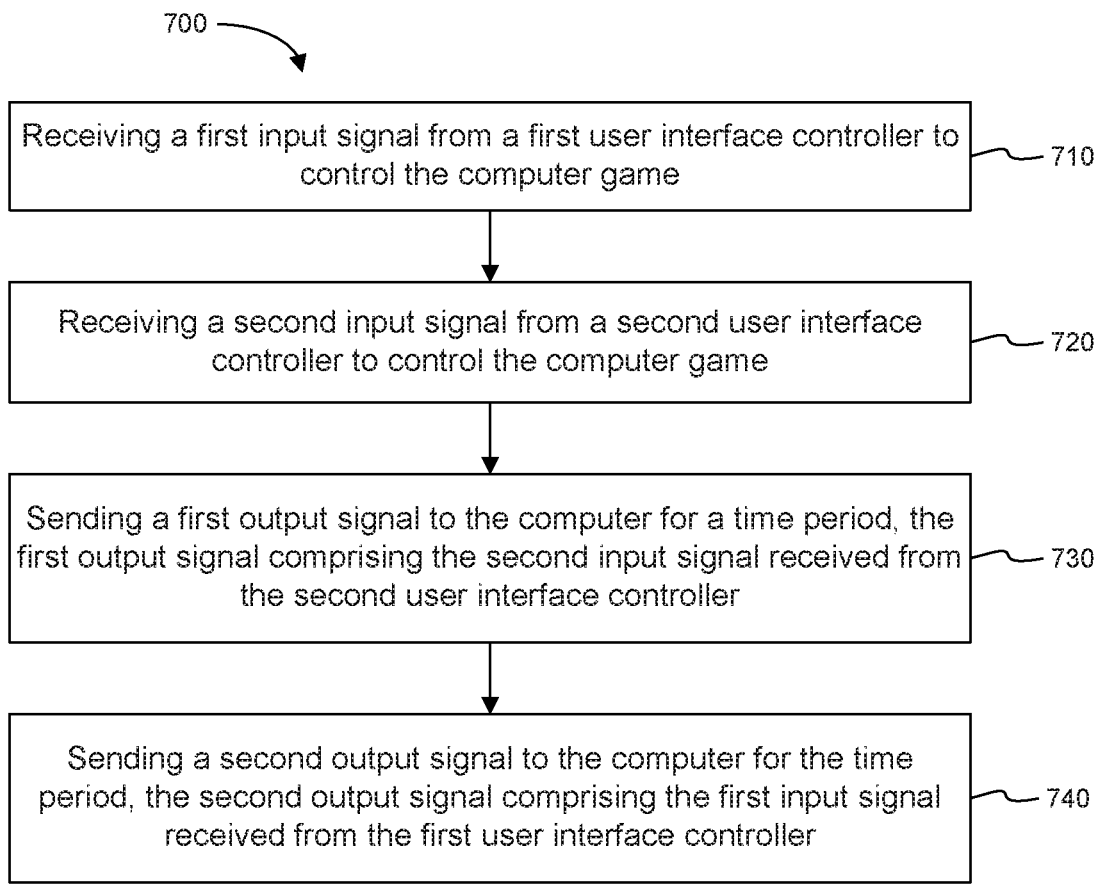
FIG. 8 illustrates a block diagram of a method of playing a computer game on a computer using a computer game interface in accordance with another example of the present technology.

With reference to FIG. 8, illustrated is a block diagram of a method 700 of playing a computer game on a computer using a computer game interface. One method step, illustrated at block 710, may be receiving a first input signal from a first user interface controller to control the computer game. Another method step, illustrated at block 720, may be receiving a second input signal from a second user interface controller to control the computer game. Still another method step, illustrated at block 730, may be sending a first output signal to the computer for a time period, the first output signal comprising the second input signal received from the second user interface controller. An additional method step, illustrated at block 740, may be sending a second output signal to the computer for the time period, the second output signal comprising the first input signal received from the first user interface controller.

The foregoing detailed description describes the technology with reference to specific examples. However, it will be appreciated that various modifications and changes can be made without departing from the scope of the present technology as set forth in the appended claims. The detailed description and accompanying drawings are to be regarded as merely illustrative, rather than as restrictive, and all such modifications or changes, if any, are intended to fall within the scope of the present technology as described and set forth herein.

More specifically, while illustrative examples of the technology have been described herein, the present technology is not limited to these examples, but includes any and all examples having modifications, omissions, combinations (e.g., of aspects across various examples), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the technology should be determined solely by the appended claims and their legal equivalents, rather than by the descriptions and examples given above.

What is claimed is:

1. A computer game interface in communication with a computer, comprising:
   a controller input, configured to receive an input signal from one of a plurality of user interface controllers and to enable a user to control a user controllable element of a game as communicated to the computer;
   a controller output that sends an output signal to the computer, the output signal having information to control the user controllable element of the game;
   a switching controller in communication with the controller input and the controller output, wherein the switching controller selects an input signal from the input signals received by the controller input and communicates the selected input signal to the controller output in order to switch between users in the game controlling the user controllable element of the game; and
   a timer controller controlling the switching controller to switch the selected input signal to the controller input communicated to the controller output based on a time period.

2. The computer game interface of claim 1, wherein the time period is predetermined by the user.

3. The computer game interface of claim 1, wherein the time period is randomly varied.

4. The computer game interface of claim 1, wherein the timer controller comprises a separate timer controller for each user interface controller.

5. The computer game interface of claim 1, wherein an alert is configured to identify when the switching controller switches the selected input signal communicated to the controller output to a second controller input.

6. The computer game interface of claim 5, wherein the alert is associated with the timer controller and includes a warning alert prior to when the time period will elapse.

7. The computer game interface of claim 5, wherein the alert is visual, audible, tactile, or combinations thereof.

8. The computer game interface of claim 1, wherein the switching controller comprises a manually operated switching mechanism to cause the switching controller to select one input signal from one interface controller as the selected input signal communicated to the controller output.

9. The computer game interface of claim 8, wherein the manually operated switching mechanism causes the switching controller to override the timer controller.

10. The computer game interface of claim 9, wherein the manually operated switching mechanism comprises a plurality of switching mechanisms, each of the plurality of switching mechanisms is configured to correspond to one of the user interface controllers.

11. The computer game interface of claim 1, further comprising an I/O signal monitor to monitor the controller input and the output signal for signal activity and to cause the switching controller to select an input signal from one interface controller as the selected input signal communicated to the controller output based on signal activity.

12. The computer game interface of claim 1, further comprising a player selector to cause the switching controller to select an input signal from a selected interface controller as the selected input signal communicated to the controller output.

13. The computer game interface of claim 12, wherein the player selector causes the switching controller to select the input signal from a randomly selected interface controller as the selected input signal communicated to the controller output.

14. The computer game interface of claim 1, wherein computer game interface information is displayable in a format visible to the user.

15. The computer game interface of claim 1, wherein a connection of at least one of the selected input signal and the output signal is configured to be a wireless connection.

16. The computer game interface of claim 1, wherein a connection of at least one of the selected input signal and the output signal is configured to be a wired connection.

17. The computer game interface of claim 1, further comprising an I/O signal amplifier for a wired connection to amplify at least one of the selected input signal and the output signal to maintain signal integrity over the wired connection.

* * * * *